United States Patent [19]

Wong

[11] Patent Number: 4,477,879
[45] Date of Patent: Oct. 16, 1984

[54] FLOATING POINT PROCESSOR ARCHITECTURE WHICH PERFORMS SQUARE ROOT BY HARDWARE

[75] Inventor: Wilson T. C. Wong, Irvine, Calif.

[73] Assignee: Sperry Corporation, New York, N.Y.

[21] Appl. No.: 334,557

[22] Filed: Dec. 28, 1981

[51] Int. Cl.³ ............................................. G06F 7/552
[52] U.S. Cl. .................................... 364/752; 364/748; 364/736
[58] Field of Search ............... 364/748, 752, 814, 715, 364/736, 754, 761, 768

[56] References Cited

U.S. PATENT DOCUMENTS

| | | | |
|---|---|---|---|
| 3,576,983 | 5/1971 | Cochran | 364/752 |
| 3,631,230 | 12/1971 | Chen | 364/752 |
| 3,906,210 | 9/1975 | Mignot | 364/752 |
| 4,126,898 | 11/1978 | Spangler et al. | 364/715 |
| 4,336,599 | 6/1982 | Wong | 364/748 |

*Primary Examiner*—Joseph F. Ruggiero
*Assistant Examiner*—Karl Huang
*Attorney, Agent, or Firm*—John B. Sowell; Tom J. Scott; Marshall M. Truex

[57] ABSTRACT

There is shown and described a floating point processor having improved architecture and configuration. The floating point processor (FPP) performs addition, subtraction, multiplication, division and square root operations. Usually, the square root operation is not built into the FPP hardware because of the increased complexity of the design, and, therefore, cost of the goods. Rather, the square root operation is usually implemented by firmware or software. The device of this invention performs the floating point square root operation in hardware rather than in software or firmware while adding very little additional hardware to existing circuitry which is required for the basic addition, subtraction, multiplication and division operations. In addition, the operations are performed as rapidly as, or more rapidly than, prior art devices.

16 Claims, 1 Drawing Figure

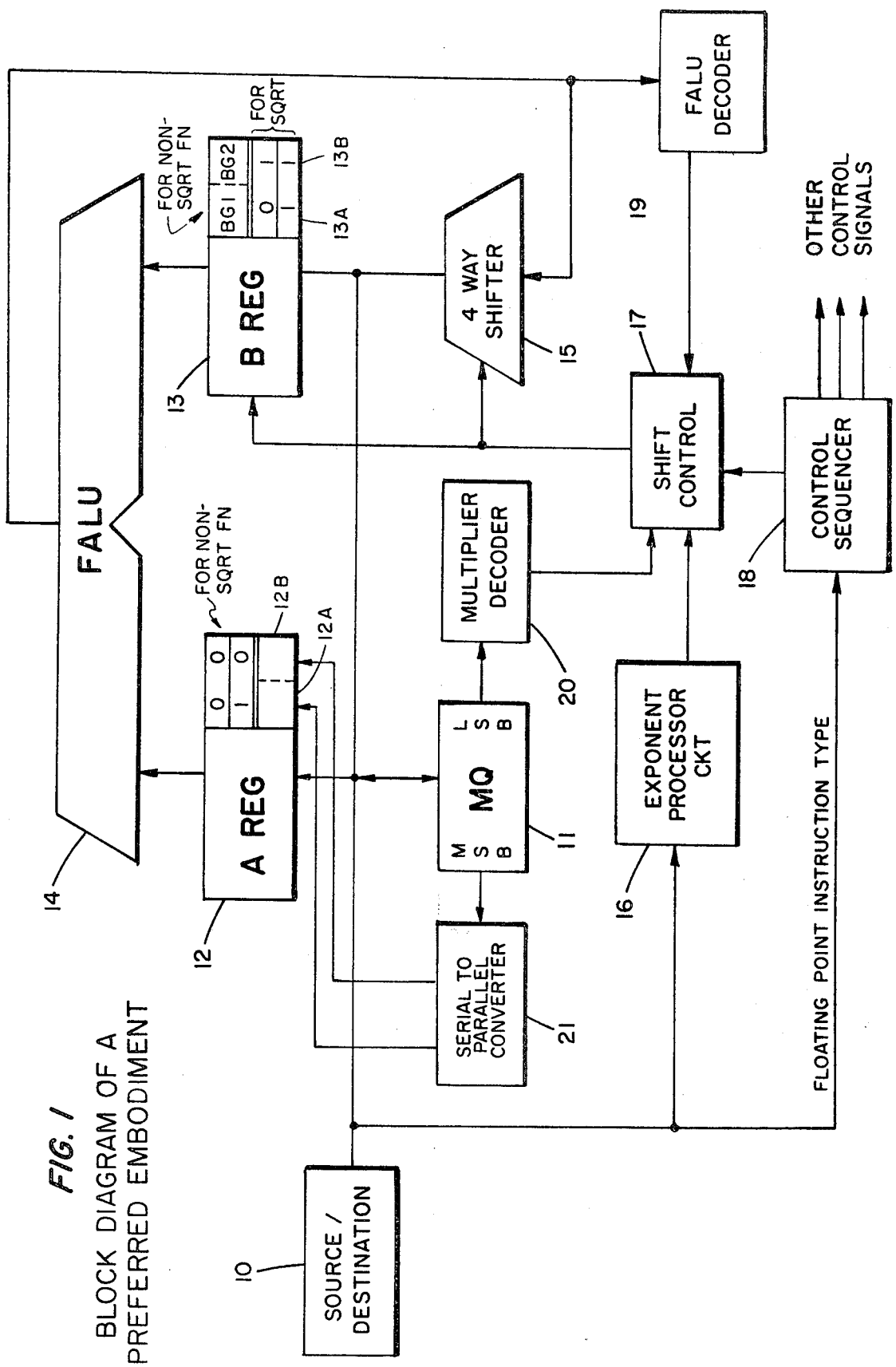
FIG. 1 BLOCK DIAGRAM OF A PREFERRED EMBODIMENT

FLOATING POINT PROCESSOR ARCHITECTURE WHICH PERFORMS SQUARE ROOT BY HARDWARE

BACKGROUND OF THE INVENTION

1. Field of the Invention

This invention is directed to computer circuitry, in general, and to an improved floating point processor with unique architecture which may perform square root, in particular.

2. Prior Art

In the prior art, there are many computing machines and systems available. Many of these systems utilize floating point processors therein to perform one or more arithmetic functions. These functions are the usual functions such as addition, subtraction, multiplication and/or division. Square root is usually not implemented in hardware. Instead, it is implemented in either firmware or software which has a significantly lower performance than an implementation in hardware. In the cases where square root is implemented in hardware the FPP circuitry is usually very complex and costly. The floating point processors operate on so-called floating point numbers which comprise a base number or mantissa as well as an exponent portion. In many cases, the floating point processor (FPP) is a limiting factor in the speed of operation of the computing machine or apparatus. That is, the computing machine can operate at a very high data rate or throughput rate while the FPP is generally slower.

In some prior art devices of this type, various techniques have been implemented in order to speed the operation of the FPP. For example, the so-called "skip-over zeros and ones" technique is used by shifting partial products rapidly when "strings of ones" or "strings of zeros" are detected. This technique is generally known to be much faster than the so-called digit-by-digit process and is especially useful in multiplication operations.

Moreover, in many of the existing FPP systems or devices, the operating speed is achieved as a tradeoff in terms of complexity and/or expensive components. However, it is highly desirable, and continuing investigations are underway in order, to provide FPP systems which can increase operating speed while reducing the complexity and expense of the circuitry.

PRIOR ART STATEMENT

While it is not an extensive review of the area, reference is made to the copending applications of W. T. C. Wong which are directed to floating point processor architecture which is known in the art.

Multiplier Decoding Using Parallel MQ Register; Ser. No. 108,339; filed Dec. 31, 1979, now U.S. Pat. No. 4,334,284.

Floating Point Processor Architecture Which Performs Subtraction With Reduced Number Of Guard Bits; Ser. No. 045,218; filed June 4, 1979, now U.S. Pat. No. 4,282,582.

Circuit For Performing A Square Root Calculation; Ser. No. 157,500; filed June 9, 1980, now U.S. Pat. No. 4,336,599.

SUMMARY OF THE INVENTION

The invention presented herein relates to a floating point processor architecture with square root capability, and, in particular, the fraction data portion thereof.

The FPP of this invention includes a unique hardware configuration which permits square root to be performed in addition to the usual basic arithmetic operations (add, subtract, multiply and divide), in a relatively rapid manner without undue complexity. This hardware configuration consists of three registers, an arithmetic and logical unit (ALU) and a combinational shifter. In particular, signals are supplied to an MQ register which is arranged in parallel for the storage of one operand. An A-register and a B-register are connected to receive signals from the source, the MQ register or the ALU through a shifter. The A-register and the B-register are connected to supply signals to an arithmetic and logical unit which performs arithmetic functions and returns the function to the A-and/or B-registers or the MQ register via the combinational shifter circuit. The A- and B-registers include portions thereof which alter the signal supplied thereto. For example, the A-register includes a series-to-parallel-converter and the B-register includes a circuit means for adding additional bits to the signal stored therein. A suitable control apparatus (for example, a control sequencer) is connected to supply control signals to the various elements including the combinational shifter as well as the A-and B-registers thereby to control the operation thereof.

Typically, these registers are the minimum number of registers required to do the four basic operations, namely, add, subtract, multiply and divide, efficiently. For example, to do a multiply operation requires one register to store the multiplier, one to store the multiplicand and one to store the partial product. This invention implements square root without adding extra registers. Moreover, the added circuitry is also minimal.

BRIEF DESCRIPTION OF THE DRAWINGS

The sole FIGURE is a block diagram of a preferred embodiment of the instant invention.

DESCRIPTION OF A PREFERRED EMBODIMENT

Referring now to the FIGURE, there is shown a block diagram of a suitable floating point processor (FPP) circuit portion. In particular, the circuit shown in FIG. 1 deals primarily with the fractional portion of the floating point number. The controls, the source and the exponent processing portion of the circuit are shown in block diagram form only.

In the particular embodiment shown in FIG. 1, source/destination 10 represents a computer system or the like. The source/destination 10 is arranged to provide instructions and floating point numbers to the circuit for processing, and also to receive the result in accordance with other operations, instructions, and/or control features which can be included in the memory, the program or the like. A transceiver or the like, which may be included in source 10, permits signals to be supplied to and received from source/destination 10. In particular, portions of the signal are supplied to an exponent processing circuit 16 which operates upon the portion of the floating point numbers which are directed to the exponent thereof. Without elaborating unnecessarily, suffice it to understand say that exponent processing circuit 16 operates to process the exponent portions of floating point numbers supplied by source 10 to form the resulting exponent and to produce appropriate control signals as a function thereof. In addition, source 10 supplies signals to and/or receives signals from the MQ register 11, A-register 12, B-register 13 and combinational shifter 15. These signals represent the fractional portion of the floating point number.

MQ register 11 is a shift register which can store signals (data) in parallel and shift in series. Data stored in MQ register 11 may be shifted out starting from the most significant bit (MSB)—, by doing left shifts, or from the least significant bit (LSB)—by doing right shifts. Moreover, data may be stored in MQ register 11 one bit at a time by doing left shifts. A serial-to-parallel converter circuit 21 is connected to the MSB end of the MQ register 11 such that MQ register 11 produces two output signals per clock period if it is shifted at twice the clock rate. These signals are concatenated to A-register 12. In particular, the signals are supplied to stages 12A and 12B of A-register 12. This interconnection arrangement has the effect of concatenating two bits of the data stored in MQ register 11 to the A-register 12 per clock period. This arrangement is important to the square root operation. When these two bits are not used for doing square root, they are used to provide extra precision for round off. The parallel MQ register can be connected to the A-register through latch circuit means.

The LSB end of the MQ register 11 goes to decoder 20 which includes a D-type flip-flop and some decoding circuits. These decoding circuits generate the control signals required to do multiplication.

The output signals from both the A-register 12 and the B-register 13 are supplied to the arithmetic logic unit (FALU) 14 wherein the signals from the A-register and B-register are operated upon. The FALU 14 may do an add or a subtract on the contents of the A- and B-registers. For subtraction, both A-B and B-A are feasible (where A and B represent the contents of the respective registers). The output of FALU 14 is connected to the input of combinational shifter 15 and returned to the A- and B-registers in a "shifted condition".

Combinational shifter 15 is a 4-way shifter, that is, shifting from 0 to 3 bit positions may be performed. It is connected in such a way that signals may be shifted left, right or not at all depending on the control signals supplied to it.

The shift control circuit 17 operates in response to the signals supplied thereto by exponent processing circuit 16, control sequencer 18, FALU decoder 19, and multiplier decoder 20. The control sequencer 18 is a microsequencer which provides control signals according to the floating point operation being performed. The FALU decoder 19 decodes the sign and most significant bits of an arithmetic operation and provides appropriate control signals. The multiplier decoder 20 decodes multiplier bits shifted out from MQ register 11 to provide control signal during multiply operations. Shift control circuit 17 is effective to control the shifting operation of shifter 15 and/or to produce a shifting of the contents of B-register 13.

One aspect of the invention which may not be readily discernible from FIG. 1 is the fact that the A-register 12 and B-register 13 are offset by one bit position. Therefore, the 4-way combinational shifter provides left shift of 2 bit positions and 1 bit position, no shift and right shift of 1 bit position to the A-register 12 while the B-register 13 receives left shift of 1 bit position, no shift, right shift of 1 bit position and 2 bit positions from the combinational shifter. This offset permits the utilization of a less complicated shifter 15 (that is a 4-way shifter instead of a 5-way shifter) as will be described hereinafter. The B register 13 also has two extra bits concatenated to its LSB end. When these two bits are not used for the square root operation, they are part of the data path to provide extra precision for round off purposes. These bits are called guard bits. All the data paths are actually 2 bits wider than the width of the fractional part of the floating point number. Therefore, instead of truncating the low order bits of an arithmetic result, a round-off may be performed. It has been shown that 2 bits are sufficient to reduce round-off error to the theoretical minimum. See the copending application by W. T. C. Wong (Ser. No. 045,218, note above). To do hardware square root, these two bits perform a different function; a '01' or a '11' is loaded into these two guard bit positions depending on the sign of the arithmetic result of a previous step. This is important for the successful operation of square root and will be explained further later.

The following paragraphs describe how the aforementioned circuit may perform the four basic arithmetic operations, namely, add, subtract, multiply and divide efficiently. It is then shown that this same architecture may perform square root with very little extra logic, thereby, providing the square root capability with negligible added cost.

In performing the addition or subtraction function, it is assumed that the first operand is already loaded into the A- and B-registers as the result of prior operations. The new number or second operand is supplied by source 10, the fractional portion of which is loaded in MQ register 11. The exponent processing circuit 16 compares the exponent portion of the new number with the exponent portion of the first operand. Depending on the outcome of the compare, the content of the MQ register 11 will be loaded into either the A-register 12 or the B-register 13 such that the mantissa with the smaller exponent (as determined by circuit 16) is in the B-register 13. Again, as a function of the operation of circuit 16, shift control signals are produced by shifter control circuit 17 and applied to B-register 13 to effect a denormalizing of the contents of the B-register. That is, the contents of B-register 13 are shifted to the right by a number of bit positions which is equal to the difference in the exponents of the numbers being operated upon.

The mantissas now stored in the A-register and the B-register are added (or subtracted) in FALU 14 and the appropriate sum (or difference) is produced at the output thereof. This output signal is returned to the B-register 13 and stored therein. The return path is via shifter 15 which is "programmed" to a straight-through (no shift) operation as a function of the signals supplied by control sequencer 18 through shift control circuit 17 during the add or subtract routine.

The result stored in B-register 13 is renormalized by a left shift under control of shift control circuit 17 and rounded off by the addition of a binary 1 in the high order guard bit position thereof. The normalized and rounded-off result, now stored in register B, is returned to either the MQ register 11 or to the A-register 12, or both. In this implementation, this storage operation is effected by clearing the A-register 12, or by clearing MQ register 11 and loading into the A-register 12 and then adding the contents of the A-register 13 and the B-register 13 via FALU 14 and transferring the output of the FALU to the A- and/or MQ registers. This is because the ALU component used in this particular implementation has only limited capabilities, namely, add and subtract. This is not a requirement for this invention. Using a different ALU component may allow the contents of the B-register to pass through the FALU disregarding the content stored in the A-register.

Now discussing the multiplication operation, it is again assumed that the first operand (i.e., multiplicand) is already stored in the A- and B-registers as a result of prior operations. As in the past, the second operand or multiplier is loaded into the MQ-register 11 from source 10. A multiply operation may be viewed as a series of additions. In this case, the B-register is cleared to zero for storing the partial product of the operation and the multiplier is right-shifted from MQ-register 11 at fine clock (FCLK) rate which is twice the speed of the system clock (HCLK) and decoded according to the string of 0's, string 1's rule.

The multiplier may be viewed as interconnected strings of 0's and strings of 1's. A string of 0's is defined as consecutive 0's broken up by isolated 1's only. The string of 0's end when consecutive 1's are encountered. Similarly, a string of 1's is consecutive 1's broken up by isolated 0's only. Then we have the rule as defined.

| String of 0's, String of 1's Rule | |
|---|---|
| String of 0's<br>String of 1's | Shift right at twice the clock speed of B-register |
| Isolated 1<br>Starting String of 0's | Add multiplicand in A-register 12 to partial product in B-register 13, right shift the result by 2 bit positions with SHFR 15 and store back into B-register 13 (in one system clock time). |
| Isolated 0<br>Starting String of 1's | Subtract multiplicand in A-register 12 from B-register 13, right shift the result by 2 bit positions with SHFR 15 and store back into B-register 13 (in one system clock time). |

Example
Multiplier

```
    Isolated    String of    Isolated
       1         1's          1's
     /         /   \          /  \
  1 000 111 000 1 1 0 0 1 1 0 0 1 0 1 0  (0000)
  |___| |___| |_____| |_____|
                  \      /
                   \    /
                    \  /
                  String of 0's
```

The parenthetical zeros at the end of the example suggest that it is assumed that a string of zeros has been previously presented.

The rules noted above are based upon the fact that $$11111111 = 100000000 - 00000001$$
$$\phantom{11111111 = 1}\diagup\phantom{0000000 - 0000000}\diagdown$$
$$\phantom{11111111 = 100000}\text{add}\phantom{0000000 - 000}\text{subtract}$$

This equation shows that instead of performing an add for each 1 appearing in the multiplier, a subtraction is performed at the LSB and an addition at the position which precedes the MSB and shift over the rest of the string. Since the shift may be performed at a higher rate than an arithmetic operation a multiplication can be performed in a reduced time frame. In point of fact, the process rate for the multiplication operation is about 2 bits per clock time. Using the same example above, we have:

```
1 000  111  000  11  00  11  00  1010
 \ /   / /  / /  / \     \       \ /
 add  sub  add sub add    sub    add
```

It can be seen that there are always two or more shifts between arithmetic operations. Therefore, in this implementation a shift of 2 bit positions always accompanies an arithmetic operation for efficiency.

While utilizing this rule, when a shift only is requested, the B-register 13 is right-shifted in response to signals from shift control circuit 17 at the fine clock rate (i.e. twice the clock rate for the system.)

Conversely, when an add or subtract operation, as well as a shift-right by two bit positions, is requested, the add or subtract operation is performed on the contents of the B-register 13 and the contents of the A-register 12. These respective registers contain the partial sum and the multiplicand as noted above. This addition or subtraction is produced via FALU 14. The result is then shifted to the right by two bit positions in the shifter 15 circuit in accordance with the control signal supplied by shift control circuit 17. All of these operations are performed in one system clock period.

When the multiplication operation is concluded, i.e., all of the multiplier signals are shifted out of MQ-register 11, the final product will be the contents of the B-register 13. This final product is then normalized by shifting to the left, rounded off by adding a 1 in the LSB and returned to and stored in the A-register 12 and the MQ-register 11 as described relative to the addition or subtraction operation.

In this operation, it is noted that the shifter 15 circuit is required to shift the signals produced by FALU 14 to the right by two bit positions.

In the division operation, it is again assumed that the first operand (dividend) is already stored in the A- and B-registers. The divisor is loaded into MQ-register 11 from source 10 in the usual manner. The divisor is then transferred from MQ-register 11 to A-register 12. MQ register 11 may now be used to store the quotient.

In the typical operation, the contents of A-register 12 (the divisor) is subtracted from the contents of the B-register 13 (dividend). If the result is positive (as detected in the circuitry included in source 10), a binary 1 is left shifted into MQ-register 11. Conversely, if the result of the subtraction is negative, a zero is left shifted into the MQ-register. The result of the subtraction (the remainder), which is performed in FALU 14, is supplied to shifter 15 and shifted by one bit position to the left and returned to the B-register. This operation is performed within one clock time.

After the remainder is stored back in B-register 13, FALU decoder circuit 19 is utilized to determine if the result includes leading zeros (in the case of a positive result) or leading ones (in the case of a negative result). In the event that the remainder is positive and includes leading zeros, the remainder is left shifted in the B-register 13 at twice the clock rate. Simultaneously, zeros are left shifted into the MQ-register 11 at the same rate. The shifting in the B-register and the MQ-register continues until a leading 1 is detected. (Note that this operation is similar to doing division long hand.)

Likewise, if the remainder is negative and leading 1's are detected, the signal is left shifted in the B-register until a leading 0 is detected. Simultaneously, the 1's are left shifted into the MQ-register 11 at the same rate. Thus, in each of these operations, a plurality of leading zeros or plurality of leading 1's in the remainder can be skipped over rapidly but the integrity of the result is maintained by the simultaneous shifting in the MQ-register.

When the binary one or binary zero is detected after the "skip over" operation, and the remainder is positive, the divisor (in the A-register) is subtracted from the remainder which is currently stored in the B-register 13. Conversely, if the partial dividend is negative, the divisor is added thereto. The addition or subtraction is performed in the FALU register. The result is again left shifted by one bit position via SHFR 15 and returned to and stored in B-register 13. Again, a 1 or 0 is left shifted into MQ-register 11 depending upon the sign of the result. To summarize, the divisor is subtracted from the remainder if it is positive and added to the remainder if it is negative.

This process is iterated until the desired number of bits of precision are obtained for the quotient stored in the MQ-register. Typically, this is effected when MQ-register 11 is filled.

Thereafter, the quotient is transferred from MQ-register 11 to B-register 13 for normalization and rounded off, as described above. Also, the normalized and rounded off quotient is transferred and stored in A-register 12 and MQ-register 11 as described above.

In the division operation, the shifter is requried to provide a left shift by one bit position during the operation.

That a square root may be done in hardware has been documented in the past. In the past, the basic principle is a "trial and error" method. For any n-bit binary number, it is known that the square root can have only half as many bits as the number, that is, n/2 bits. If n is odd, then the square root has (n+1)/2 bits.

It is also known that the square root cannot be less than 1000...0 (with the number of bits defined above). This number is squared, and subtracted from the number to be square rooted. If the result is positive (which must be true in this case), the number 1100...0 is tried (again with half as many bits as the number to be squared).

The number is again squared and subtracted from the number to be square rooted. If the result is positive, 11100...0 is tried and so on. Therefore, for each try, on extra bit is determined for the root, until all the bits for the required accuracy are determined. To implement this operation in hardware, a modified method is used to simplify the hardware design and speed up the process.

Suppose X=01,11,11,10,10,01 is the number to be square rooted. First, try the number 100000 as the root, which gives the square of 1,00,00,00,00,00 which is subtracted from x as shown.

$$\begin{array}{r} 01,11,11,10,10,01 \\ - \ 01,00,00,00,00,00 \\ \hline 11,11,10,10,01 \end{array}$$

The result produced in this operation is positive.

Next the number 110000 is tried as the root. However, instead of subtracting the square of this root from the number to be square rooted, use the remainder obtained in the last operation as indicated above. Let 'a' be the root obtained so far and let 'b' be the increment to 'a' to be tried. Thus, the new root is a+b and the square of the new root is $(a+b)^2 = a^2 + b^2 + 2ab$. The remainder R is equal to $X - a^2$. Subtracting the new root from the original number is the same as subtracting $b^2 + 2ab$ from the remainder. $X - a^2 - b^2 - 2ab = R - b^2 - 2ab$.

In this example a=100000 and b=010000. Therefore, $(a+b)^2 = a^2 + b^2 + 2ab = a^2 + 1,00,00,00,00 + 1,00,00,00,00,00$. Notice that 2ab is the same as left shifting 'a' by the length of 'b'. Therefore, in this example, the number to be subtracted from the remainder should be $(b^2 + 2ab)$ and the next operation is:

$$\begin{array}{rl} 11,11,10,10,01 & (R) \\ - \ 1,01,00,00,00,00 & (b^2 + 2ab) \\ \hline 1,10,11,10,10,01 \end{array}$$

This time a negative result is produced which means that the assumed root is too large. Therefore, the next bit of the root should be '0' instead of '1'. The next increment to be tried is 001000 instead, which is b/2. The square of this new root equals $(a+b/2)^2 = a^2 + b^2/4 + ab$. Again, the remainder is operated upon. The remainder now equals: $R = x - a^2 - b^2 - 2ab$. However, what is actually desired is $x - (a^2 + b^2/4 + ab)$ which is equal to $(x - a^2 - b^2 - 2ab) + ab + 3b^2/4 = R + ab + \frac{3}{4}b^2$; where $\frac{3}{4}b^2 = 11,00,00,00$; $ab = \frac{1}{2}(2ab) = 10,00,00,00,00$. Therefore, $ab + \frac{3}{4}b^2 = 10,11,00,00,00$. Thus, an add to the remainder is performed instead and produces $$\begin{array}{r} 1,10,11,10,10,01 \\ + \ \ \ \ 10,11,00,00,00 \\ \hline 1,10,10,10,01 \end{array}$$

The result is positive showing that the assumed root 101000 is smaller than the actual result. So a '1' may be "tacked" onto the root.

From this, a general rule can be generated as shown in the following example $$\begin{array}{rl} 01,11,11,10,10,01 & \\ - \ \ \ \ \ \ \ \ \ \ \ \ 01 & \text{number to be} \\ \hline 11,11,10,10,01 & \text{square rooted} \\ - \ \ \ [1]\,01,00,00,00,00 & \\ \hline 1111,10,11,10,10,01 & \\ + \ \ \ \ \ \ [10],11 & \\ \hline 1,10,10,10,01 & \\ - \ \ \ \ [101],01,00,00 & \\ \hline 1,01,10,01 & \\ - \ \ \ \ [1011],01 & \\ \hline 111111,10,10,01,01, & \\ + \ \ \ \ \ \ \ [1,01,10],11 & \\ \hline 0,00,00,00,00 & \end{array}$$

The numbers in the brackets are the partial roots found in each step. After every operation, if the result is positive, i.e. zero or greater, a '1' is concatenated to the partial root, and the next operation will be a subtract. The partial root is right shifted by 1 bit position, and a '01' is appended onto it. Then a subtract is performed against the remainder. If the result of an operation is negative, i.e. less than zero, a '0' is concatenated onto the partial root. The partial root is again shifted right to by one bit position, and '11' is appended onto it instead. Then the whole thing is added to the remainder and the procedure is repeated until the full square root is obtained.

The hardware implementation basically uses this algorithm. However, instead of right shifting the partial root, the partial root is actually left shifted one bit position in each operation. The extra bit found is concatenated into the partial root from the right while it is being left shifted. The remainder is also left shifted by two bit positions after each addition or subtraction operation. Therefore, it is equivalent to right shifting the partial root by one bit. This is a key point in saving hardware in this invention.

In the square root operation, the number for which the square root is to be taken is loaded into MQ-register 11 and both the A-register 12 and B-register 13 are cleared. The two most significant bits (MSB) of the number stored in MQ-register 11 are now shifted out to the left and parallel loaded into the A-register extension, i.e., stages 12A and 12B which are added to A-register 12. MQ-register 11 is shifted at the fine clock rate, i.e., twice the system clock rate. Therefore, the extension register (12A and 12B) may be updated at system clock rate.

The appropriate control signal from shift control 17 (as derived from FALU decoder 19 causes either '01' or '11' to be loaded into the B register extension 13A and 13B. At the beginning of a square root operation, '01' is always used. Then the contents of B-register 13 (with the 2-bit B-register extension 13A and 13B) are subtracted from the contents of A-register 12 which includes the 2-bit register A extension 12A and 12B.

The result of the subtraction, which is performed in FALU 14, is examined by the FALU decoder 19 for positive or negative sign. If the result is positive, a 1 is left shifted into the LSB position of the B-register -13. If the result is negative, a 0 is left shifted into B-register. The result is also left shifted by two bit positions by the SHFR 15 circuit and stored in A-register 12. All of these operations can be accomplished within one clock time.

If the result is positive, '01' will again be loaded to the B-register extension 13A and 13B and another subtract operation will be performed by FALU 14. On the other hand, if the result is negative, '11' will be loaded to the B-register extension 13A and 13B and an add operation will be performed by FALU 14. In any event, the result is always left-shifted by two bits via SHFR circuit 15 and stored in A-register 12.

This operation is repeated until the desired precision is obtained. Therefore, one extra bit of the square root result is obtained for each system clock period. The result of the square root operation is then stored in the B-register and normalized. The normalized signal is loaded into the MQ- and A-registers as noted above. In the square root operation, roundoff is generally not required. In the square root operation, it is necessary for the shifter circuit 15 to produce a left shift of 2 bits.

Consequently, it is seen that for the FPP circuit to provide the add, subtract, multiply, divide and square root operations, it is necessary that the shifter circuit be able to provide a left shift of two bits (square root), a left shift of one bit (divide), a right shift by two bits (multiply) and a straight-through or 0 shift operation (add/subtract). Therefore, a five-way shifter would appear to be required. However, the B-register requires a right shift by two bit positions during the multiply operation and the A-register requires a left shift of two bit positions during the square root operation. At no time does the B-register require a left shift of two bits, nor does the A-register require a right shift of two bits. Consequently, by offsetting the A- and B-registers by one bit position, the same net effect can be achieved by using a "four-way" shifter circuit. This arrangement can be obtained by the following shift control arrangement:

| Shifter Control | B | A |
| --- | --- | --- |
| 0 | RS 2 | RS 1 |
| 1 | RS 1 | SH 0 |
| 2 | SH 0 | LS 1 |
| 3 | LS 1 | LS 2 |

Consequently, with the circuit arrangement shown and described, a four-way shifter can be used to provide the operation of a five-way shifter and to permit an FPP to be produced which can perform the add, subtract, multiply, divide and/or square root operation.

It has been shown that by using a unique architecture and the addition of very little extra hardware, the square root function may be performed in hardware in addition to the four basic functions, namely, add, subtract, multiply and divide, usually implemented. A method is also shown which minimizes the complexity of the combination shifter. The system and method which have been shown and described are intended to be illustrative only and are not intended to be limitative. The scope of the invention is limited only by the scope of the claims appended hereto.

I claim:

1. A floating point processor (FPP) architecture which permits square root operations, comprising,
   first register means for storing a signal to be operated upon,
   arithmetic logic circuit means,
   second register means connected to supply signals to and receive signals from said arithmetic logic circuit means,
   third register means connected to supply signals to and receive signals from said arithmetic logic circuit means,
   said second register means and said third register means have the contents thereof offset by a portion of the length of the signals supplied thereto,
   circuit means connected from said first register means to said second register means to supply signals to an end of the signal extant in said second register means,
   shifter means connected to receive signals from said arithmetic logic circuit means and to supply signals to each of said first, second and third register means,
   said shifter means operative to selectively shift the signals supplied thereto either to the left or to the right, and
   control means connected to said shifter means to control the operation thereof.

2. The FPP architecture recited in claim 1 including, fourth register means concatenated to one end of said second register means.

3. The FPP architecture recited in claim 2, wherein, said fourth register means is concatenated to the least significant bit end of said second register means.

4. The FPP architecture recited in claim 1 including, fifth register means concatenated to one end of said third register means.

5. The FPP architecture recited in claim 4 wherein, said fifth register means is concatenated to the least significant bit end of said third register means.

6. The FPP architecture recited in claim 1 wherein, the most significant bit end of said first register means is connected to said circuit means.

7. The FPP architecture recited in claim 1 wherein, the least significant bit end of said first register means is connected to said control means.

8. The FPP architecture recited in claim 1 wherein, receive signals from said control means includes decoder means connected to said first register means.

9. The FPP architecture recited in claim 1 wherein, said shifter means is capable of shifting signals by multiple bit positions.

10. The FPP architecture recited in claim 1 wherein, said control means includes an exponent processor circuit for operating upon the exponent portion of a floating point number.

11. The FPP architecture recited in claim 1 wherein, said control means includes decoder means connected between said arithmetic logic circuit means and said shifter means.

12. The FPP architecture recited in claim 1 wherein, said control means determines the type of floating point operation to be performed.

13. The FPP architecture recited in claim 12 wherein, said control means includes control sequencer means connected to receive signals from said source means and to supply signals to said shifter means to control the floating point operation to be performed.

14. The FPP architecture recited in claim 1 including, source means for supplying information to and receiving information from said first register means.

15. The FPP architecture recited in claim 1 wherein, the signal contents of one of said second and third register means is aligned with the signal contents of said first register means.

16. The FPP architecture recited in claim 1 wherein, said first register produces serial output signals, and said circuit means comprises serial-to-parallel converter means to supply parallel signals to said second register means.

* * * * *